United States Patent
Dillingham et al.

(10) Patent No.: US 10,801,966 B2
(45) Date of Patent: Oct. 13, 2020

(54) METHOD AND DEVICE FOR MEASURING SURFACE PROPERTIES

(71) Applicant: Brighton Technologies LLC, Cincinnati, OH (US)

(72) Inventors: Raymond Giles Dillingham, Cincinnati, OH (US); Brietta Rose Oakley, Palmdale, CA (US); Lucas Hale Dillingham, Cincinnati, OH (US); Andrew Davis Gilpin, Cincinnati, OH (US); Francis Charles Ganance, Cincinnati, OH (US); Timothy James Barry, Cincinnati, OH (US); Harun Mohammed, Cincinnati, OH (US)

(73) Assignee: BRIGHTON TECHNOLOGIES LLC, Cincinnati, OH (US)

( * ) Notice: Subject to any disclaimer, the term of this patent is extended or adjusted under 35 U.S.C. 154(b) by 119 days.

(21) Appl. No.: 15/521,374

(22) PCT Filed: Oct. 26, 2015

(86) PCT No.: PCT/US2015/057424
§ 371 (c)(1),
(2) Date: Apr. 24, 2017

(87) PCT Pub. No.: WO2016/065369
PCT Pub. Date: Apr. 28, 2016

(65) Prior Publication Data
US 2017/0307536 A1  Oct. 26, 2017

Related U.S. Application Data

(60) Provisional application No. 62/068,558, filed on Oct. 24, 2014.

(51) Int. Cl.
*G01N 13/00* (2006.01)
*G01N 21/85* (2006.01)
*G01N 13/02* (2006.01)

(52) U.S. Cl.
CPC ......... *G01N 21/8507* (2013.01); *G01N 13/02* (2013.01); *G01N 2013/0208* (2013.01)

(58) Field of Classification Search
CPC .... G01N 21/8507; G01N 13/02; G01N 13/00; G01N 2013/0208
USPC .. 73/53.01, 54.01, 54.02, 64.48, 64.52, 104, 73/866; 348/61, 135; 356/601, 36
See application file for complete search history.

(56) References Cited

U.S. PATENT DOCUMENTS

2005/0186873 A1* 8/2005 Wang et al.
2011/0311764 A1* 12/2011 Hulseman et al.

\* cited by examiner

*Primary Examiner* — Robert R Raevis
(74) *Attorney, Agent, or Firm* — Jenei LLC

(57) ABSTRACT

A method and testing apparatus determine receding contact angles of liquids on surfaces by depositing a liquid in a manner whereby the volume of the drop is increased through stepwise addition of smaller drops. Each increment of volume growth causes the perimeter of the drop to advance across the surface. The incremental volume elements impart sufficient energy to the growing drop such that the drop perimeter expands beyond its equilibrium diameter for that volume. The drop perimeter tends to contract between volume additions as the excess energy is dissipated. The method and testing apparatus determine the receding contact angle between the incremental volume additions.

19 Claims, 6 Drawing Sheets

METHOD AND DEVICE FOR MEASURING SURFACE PROPERTIES

PRIORITY AND CROSS-REFERENCE TO RELATED APPLICATIONS

The present application is a § 371 national entry of International Patent Application No. PCT/US2015/057424 to Dillingham et al., filed 26 Oct. 2015, entitled "Method And Device For Measuring Surface Properties", published as WO 2016065369 A1 on 28 Apr. 2016, and which claims the benefit of priority to U.S. Patent Provisional Application Ser. No. 62/068,558 entitled "Method And Device For Measuring Surface Properties", filed 24 Oct. 2014, the contents of both of which are hereby incorporated by reference in their entirety.

BACKGROUND OF THE INVENTION

1. Field of the Invention

The field of art disclosed herein pertains generally relates to a device and method to measure wetting characteristics of a surface, and more particularly relates to a device and method for establishing and measuring the receding contact angle.

2. Description of the Related Art

A need exists for a method and a device that is quickly and quantitatively sensitive to the properties of the surface of a material or an object. One reason for making these measurements is to determine if a surface is properly prepared and ready for further processing, such as printing or sealing. Another reason is to provide a feedback signal that can be used to control a process such as a coating process or a corona, flame, or plasma treatment process.

The properties of a surface are determined primarily by the surface chemical composition. One measurable property that is sensitive to the surface chemical composition is the contact angle established between a liquid drop and the surface. The contact angle is the angle between the surface and a tangent to the liquid drop at the point of contact with the surface.

Contact angles are usually measured using a device known as a contact angle goniometer. A drop of the probe liquid is placed on the surface to be interrogated, the plane of the surface is brought into the line of sight of a telescope containing a measuring scale, and a reticle in the telescope is made tangent to the drop profile at the point of contact with the surface. The angle that this line makes with the surface is defined as the contact angle. The contact angle can also be determined by computerized analysis of a digital image of the drop.

The contact angle is determined by three parameters: the surface energy of the surface ($\gamma_s$), the surface energy of the liquid ($\gamma_l$), and the interfacial energy between the liquid and the surface ($\gamma_{sl}$), and is described by the Young-Dupré Equation shown in Equation 1:

$$\cos\theta = \frac{\gamma_s - \gamma_{sl}}{\gamma_l} \quad (1)$$

Both $\gamma_s$ and $\gamma_{sl}$ are sensitive to the surface chemical composition and therefore the contact angle $\theta$ is sensitive to the surface composition. Because of the geometry of a liquid drop, there are other features that can be measured instead of or along with the contact angle. These include the diameter and/or the height of the drop, which can be used to calculate the contact angle by a variety of methods.

There are multiple equilibrium contact angles that can be established between a liquid drop and a surface. The contact angle that is established as the perimeter of a liquid drop advances across the surface is called the advancing angle. This is the largest equilibrium angle. The angle that is established as the drop perimeter retracts from a previously wet surface is referred to as the receding angle. This is the smallest equilibrium angle.

Because the receding angle is established during the process of removing the liquid from the surface, it is believed by many workers to be related to the adhesion of the liquid to the surface. Contact angle hysteresis (the difference between the advancing and receding contact angles) is considered another important parameter in understanding the properties of a surface and of course requires knowledge of the receding angle.

The receding contact angle is normally measured one of two ways. One method involves depositing a drop of liquid onto a surface from a device like a syringe. As the drop volume is increased slowly, the drop perimeter establishes the advancing contact angle with the surface. If the drop volume is then slowly decreased by removing liquid, the drop perimeter remains motionless while the contact angle decreases. The receding angle is the angle that is established when the drop perimeter just begins to move. Another method involves an instrument known as a Wilhelmy balance. A sample of material is suspended from the arm of a balance and immersed in a liquid. The force required to remove the sample from the liquid in the limit of low velocity is used to calculate the receding contact angle.

These methods and others for determining the receding contact angle are slow and cumbersome to perform. In particular they are ill suited for rapid, convenient measurement in industrial settings. A need exists for a more rapid and convenient method for obtaining a receding contact angle.

SUMMARY OF THE INVENTION

In one aspect, the present disclosure provides an apparatus and method for measuring the wetting characteristics of a liquid on a surface of a test article. In one or more embodiments, a testing apparatus determines a reduced contact angle, such as a receding contact angle, of liquid by including an imaging sensor positioned at a known vantage point to the surface of the test article. A liquid dispenser deposits a liquid drop on the surface in more than one droplet that each impart an amount of energy to the liquid drop. After a time interval for allowing the liquid drop to form a reduced contact angle with the surface, a data generator detects via the imaging sensor a geometric characteristic of the liquid drop that is related to reduced contact angle of the liquid drop to the surface and determines the reduced contact angle based at least in part upon the geometric characteristic.

According to one or more embodiment, the present disclosure provides a method of determining a reduced contact angle of liquid on a test article. The method includes positioning an imaging sensor at a known vantage point to a surface of a test article. The method includes depositing, with a liquid dispenser, a liquid drop on the surface in more than one droplet that each impart an amount of energy to the liquid drop. The method includes after a time interval after a selected droplet for allowing the liquid drop to form a reduced contact angle with the surface, detecting via the imaging sensor a geometric characteristic of the liquid drop that is related to a reduced contact angle of the liquid drop to the surface. The method includes determining with a data generator the reduced contact angle based at least in part upon the geometric characteristic.

According to one or more embodiment, the present disclosure provides a method for obtaining receding contact angles of liquids on surfaces. The method includes depositing a liquid in a manner whereby the volume of the drop is increased through stepwise addition of smaller drops, whereby each increment of volume growth causes the perimeter of the drop to advance across the surface, whereby the incremental volume elements sufficient energy is imparted to the growing drop such that the drop perimeter expands beyond its equilibrium diameter for that volume, and whereby the drop perimeter will tend to contract between volume additions as the excess energy is dissipated. The method includes determining the receding contact angle between the incremental volume additions.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

The present innovation relates generally to a device and method for determining properties of a surface. Applicants have found that a receding contact angle can be rapidly and conveniently established with a surface by depositing the liquid in a manner whereby the volume of the drop is increased through stepwise addition of smaller drops. Each increment of volume growth causes the perimeter of the drop to advance across the surface. If by addition of the incremental volume elements sufficient energy is imparted to the growing drop such that the drop perimeter expands beyond its equilibrium diameter for that volume, the drop perimeter will tend to contract between volume additions as the excess energy is dissipated, and will tend to establish the receding contact angle. Establishing the true receding contact angle requires imparting sufficient energy during the incremental volume additions. The present innovation provides for devices and methods for establishing and measuring the receding contact angle.

Figure 1:
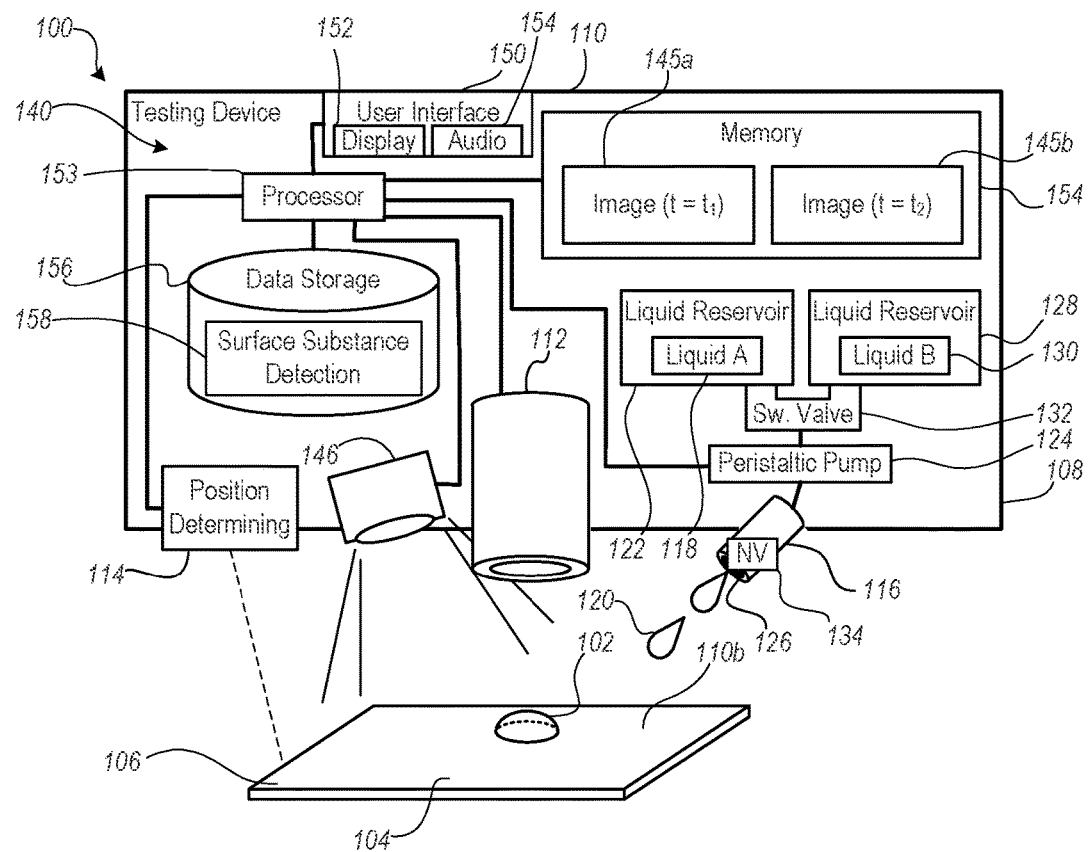
FIG. 1 illustrates a block diagram of a testing apparatus for determining a reduced contact angle of liquid on a test article, according to one or more embodiments.

FIG. 1 illustrates a testing apparatus 100 for expeditiously determining a reduced contact angle such as receding contact angle of liquid drop 102 on a surface 104 of a test article 106. In particular, the testing apparatus 100 detects one or more geometrical features of the liquid drop 102 to determine a contact angle. In one embodiment, the testing apparatus 100 is incorporated within a hand-held housing 108 to form a testing device 110. In one embodiment, a single, handheld device can be extremely convenient for use in a manufacturing environment on a variety surfaces and structures in a variety of orientations.

The testing device 110 positions an imaging sensor 112 such as video camera with telescopic optics at a known vantage point to the surface 104. The testing device 110 can include position determining component 114 that provide a physical reference or a sensed reference to the surface 104. A liquid dispenser 116 dispenses a liquid 118 as liquid droplets 120 along a trajectory toward the surface 104 to form and to impart energy to the liquid drop 102. For example, the liquid 118 can be contained in a liquid reservoir 122 that is propelled by a peristaltic pump 124 through an orifice 126 of the liquid dispenser 116 that is sized to create liquid droplets 120 of a selected volume and at a selected velocity. In one embodiment, a second liquid reservoir 128 contains a second liquid 130 having a wetting characteristic or different solubility characteristic in order to obtain a more accurate measurement of contact angle. A reservoir switching valve 132 is switched between the liquid reservoirs 122, 128. Thus, contact angle measurements can be determined with two or three liquids in order to evaluate these two- or three component vector quantities and to obtain a more accurate surface energy calculation.

The liquid dispenser 116 can control energy of the liquid droplets 120 to compensate for air drag and gravity effects along the trajectory in order to impart sufficient energy to the liquid drop 102. For example, a nozzle valve 134 can control a size of a nozzle orifice or accumulated volume. For another example, a variable amount of pressure can be exerted by the peristaltic pump 124. In an exemplary embodiment, a nozzle having 0.003-0.007" diameter orifice includes a direct dispense sapphire nozzle achieves a higher velocity than a standard stainless nozzle with a 0.015" diameter nozzle.

Exemplary liquids that may be used with the device and method described here are deionized water, dimethyl sulfoxide (DMSO), mixtures of formamide with glycol monoethyl ether, mixtures of water and ethanol, and other liquids with desirable wetting characteristics.

The imaging sensor 112 can be positioned to measure one or more parameters of the volume, height, base diameter, and curvature of the liquid drop 102. A data generator 140 analyzes images 145*a*, 145*b* of the liquid drop 102 to measure two or more parameters selected from the group consisting of volume, height, base diameter and curvature of the liquid drop 102. In one embodiment, the volume of the liquid drop 102 is known based upon the repeatability of the creation of droplets 120. Based upon the analysis, the data generator 140 calculates a contact angle based upon the two or more parameters.

In one embodiment, the testing device 110 further includes an illuminator 146 such as a laser. The data generator 140 detects via the imaging sensor 112 the geometric characteristic of the liquid drop 102 by illuminating the liquid drop 102 with the illuminator 146. The data generator 140 measures one of reflection and refraction imparted to the illumination by the liquid drop 102. The data generator 140 determines the contact angle based upon the measured one of reflection and refraction.

The testing device 114 may also include an additional source of illumination such as a light emitting diode (LED), laser, fluorescent, incandescent, strobe light, camera flash, or other suitable source of light for illuminating the volume of liquid on the surface of the material. The source of illumination may be incorporated into the housing 120 or may be separate from the housing 120.

The testing device 114 may be operated by a single actuating device, or, where desired, additional actuating devices or user interfaces 150 including a visual display 151 and auditory signaling device 152 could be added to control the device or to input data, such sample information or test parameters. The user interface 150 could include a touch screen, a keypad, a toggle, a button, a rollerball, a wheel, a dial, a mouse, etc. The testing device 114 may include a microprocessor 153 and may optionally entirely contained within the housing 120. The testing device 114 could utilize memory 154 a storage device 156 can store data collected and generated by the testing device 114. The data generator 140 can include a surface substance detection utility 158 that is stored in the storage device 156 and executed by the microprocessor 153. The stored data could be retrieved from the device by known methods, such as wireless transmission to a remote device, storage on removable media (not shown), like a thumb drive or memory chip, and transmission via an electric cable or docking station (not shown). The stored data could have numerous uses such as with quality control and compliance with manufacturing standards and regulations.

The device includes a housing, a liquid dispensing component, position determining component and a data generating component. The liquid dispensing component, which is also referred to herein as the liquid dispenser, is configured to deposit a volume of a liquid on the surface of a substrate material. The position determining component is configured to obtain information about the position of the device relative to the volume of liquid on the surface. The data generating component, also referred to herein as the data generator, is configured to obtain information about the geometry of the volume of the liquid on the surface of the material.

In one aspect of the invention, the liquid dispenser involves the ballistic deposition of multiple smaller volumes of liquid to the surface of the material to construct the volume of liquid. This embodiment includes a nozzle in fluid communication with a liquid reservoir. The liquid is pressurized prior to exiting the nozzle and may be pressurized in the reservoir, the nozzle, or in an intermediate stage, such as in a peristaltic pump. Pressurization of the reservoir may be accomplished by a piston or by other pressurization techniques, such as pumps and gas charging. The nozzle may be electrically actuated between an open state and a closed state such that when in the open state the pressurized liquid is dispensed onto the surface of the material through the nozzle, and when in the closed state liquid is not dispensed. This embodiment dispenses pulses of multiple smaller volumes of liquid directed to the same location of the surface of the material to construct the volume of liquid.

The smaller volumes of liquid may be on the order of about 10 nl, about 50 nl, about 100 nl, about 200 nl, about 300 nl, or about 400 nl. The smaller volumes are provided in pulses to reach the final volume of liquid, which, in one embodiment, may range from between about 0.5 µl to about 10 µl. In another embodiment, the final volume of liquid may range from between about 1 µl to about 5 µl. In another embodiment, the final volume of liquid is about 2 µl. The volume of liquid may be deposited over a relatively short period of time ranging from about 0.01 seconds to about 1.0 seconds. In one embodiment, the volume of liquid is deposited in about 0.5 seconds or less. Other smaller volumes of liquid and final volumes of liquid, and deposition times may also be used in the presently described devices and methods.

In another embodiment, the liquid dispensing component is an elongated hollow projection having an opening distal to the housing and a fluid reservoir in fluid communication with the hollow projection. Examples of possible elongated hollow projections include syringe needles and pipette tips. The volume of liquid passes from the fluid reservoir, through the hollow projection, and exits the hollow projection at the distal opening where it is deposited onto the surface of the material. The elongated hollow projection may optionally double as the kinetic energy imparting component. For example, the hollow projection may be coupled to a device capable of imparting kinetic energy in the form of vibration to the hollow projection, which in turn imparts the kinetic energy to the volume of liquid. Examples of suitable kinetic energy imparting devices are an electromagnetic transducer, a piezoelectric transducer, an electric motor with an eccentric mass, an acoustical device, and combinations of these devices.

The position determining component determines the position of the device relative to the volume of liquid on the surface by measuring at least one of the distance of the data generating component from the surface of the material or the angle of the data generating component relative to the surface of the material. The position determining component may be as simple as a mechanical probe having a fixed length which maintains a fixed distance between the data gathering component and the volume of liquid on the surface. In this embodiment, the mechanical probe contacts the surface of the material to maintain the relative position of data generating component. The position determining component may also include a point light source, a laser (not shown), and an acoustical measuring device (not shown).

The use of a point light source, laser, or acoustical measuring device as the position determining component, may allow the device to accurately measure or calculate the contact angles without actually contacting the surface of the material. The point light source illuminates an area on the surface of the material. The shape of the illuminated area will be a conic section. The shape of the illuminated area may be analyzed along with the volume of liquid to calculate the distance from the surface and the angle (α) between the plane of the surface and the data gathering component. The point light source, laser, and acoustical measuring device allow for the construction of a device which merely has to be pointed at the surface from anywhere within a range of distances, such as within a range of about 0.5 inches to about 2 inches, or in a range of about 1 inch to about 1.5 inches. The range of distances over which the device may operate is determined by various factors including, for example, the effective ranges of operation for the liquid dispensing component and/or the data generating component.

The data generating component is a device capable of obtaining information about the geometry of the volume of liquid on the surface of the material. The geometric information includes the shape, the contact angle of the lead edge, average contact angle, a diameter (d), the average diameter, and/or the curvature of the volume of liquid on the surface of the material. Exemplary data generating components include a camera, laser, scanner, and/or an acoustical device. The exemplary data generating component illustrated in the figures is a camera. In some embodiments, the data generating component and the position determining component can be included in the same element. For example, a laser or an acoustical device could function as both a data generating component and the position determining component.

The device may also include an additional source of illumination such as a light emitting diode, fluorescent, incandescent, strobe light, camera flash, or other suitable source of light for illuminating the volume of liquid on the surface of the material. The source of illumination may be incorporated into the housing or may be separate from the housing (not shown).

The device may be operated by a single actuating device, or, where desired, additional actuating devices or user interfaces could be added to control the device or to input data, such sample information or test parameters. The user interface could include a touch screen, a keypad, a toggle, a button, a rollerball, a wheel, a dial, a mouse, etc. The electronic circuit may include a microprocessor and may optionally entirely contained within the housing. The electronic circuit could also store data collected and generated by the device. The stored data could be retrieved from the device by known methods, such as wireless transmission to a remote device, storage on removable media (not shown), like a thumb drive or memory chip, and transmission via an electric cable or docking station (not shown). The stored data could have numerous uses such as with quality control and compliance with manufacturing standards and regulations.

The device may further include a display coupled to the electronic circuit for displaying information that includes data and/or an image. The display may include a light emitting diode (which includes both individual and screens of light emitting diodes), a liquid crystal display, and/or a gauge. The display may be located in or on the housing or, may be located in or on a secondary housing o remote device, and coupled to at least a portion of the electronic circuit by at least one of an electrical contact (not shown), electrical cable, and a wireless connection. The display can convey any information deemed relevant to the use of the device such as the surface energy of the surface, a representation of the volume of the liquid on the surface, an image of the volume of the liquid on the surface, a pass indicator, a fail indicator, an error message, a diameter of the volume of the liquid on the surface, an average diameter of the volume of the liquid on the surface, the contact angle formed by the volume of liquid on the surface, the shape of the volume of liquid on the surface, the wetting characteristics of the surface, battery charge, and reservoir volume.

The device may optionally include an auditory signaling device (not shown). The auditory signaling device may be as simple a tone or mixture of tones, or complex as speech. The auditory signaling device may, for example, indicate that the device is in use, that a test was successfully or unsuccessfully completed, a pass or fail indicator, an error, that the device is the correct relative position relative to the surface, battery life, and remaining liquid volume in the reservoir.

Exemplary liquids that may be used with the device and method described here are deionized water, dimethyl sulfoxide (DMSO), mixtures of formamide with glycol monoethyl ether, mixtures of water and ethanol, and other liquids with desirable wetting characteristics.

In one embodiment, contact angle measurements are determined with two or three liquids in order to evaluate these two- or three component vector quantities and to obtain a more accurate surface energy calculation.

In one embodiment, energy is imparted to the liquid drop by a microburst of air rather than another droplet in order to measure the receding contact angle.

The testing display 110 may include a light emitting diode (which includes both individual and screens of light emitting diodes), a liquid crystal display, and/or a gauge. The display 151 may be located in or on the housing 120 or, may be located in or on a secondary housing or remote device, and coupled to at least a portion of the testing device 114 by at least one of an electrical contact, electrical cable, and a wireless connection. The display 151 can convey any information deemed relevant to the use of the device such as the surface energy of the surface, a representation of the volume of the liquid on the surface, an image of the volume of the liquid on the surface, a pass indicator, a fail indicator, an error message, a diameter of the volume of the liquid on the surface, an average diameter of the volume of the liquid on the surface, the contact angle formed by the volume of liquid on the surface, the shape of the volume of liquid on the surface, the wetting characteristics of the surface, battery charge, and reservoir volume.

The device may optionally include an auditory signaling device 152. The auditory signaling device may be as simple a tone or mixture of tones, or complex as speech. The auditory signaling device may, for example, indicate that the device is in use, that a test was successfully or unsuccessfully completed, a pass or fail indicator, an error, that the testing device 114 is the correct relative position relative to the surface, battery life, and remaining liquid volume in the reservoir.

Figure 2:
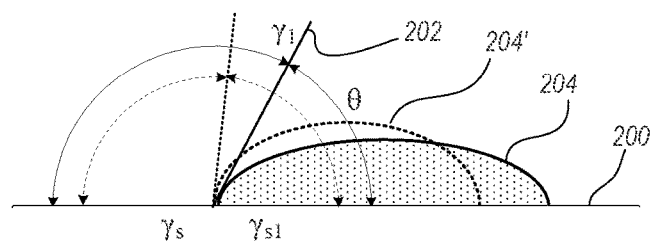
FIG. 2 illustrates a diagram of a contact angle is the angle between the surface and a tangent to the liquid drop at the point of contact with the surface, according to one or more embodiments.

With reference to FIG. 2, the properties of a surface are determined primarily by the surface chemical composition. One measurable property that is sensitive to the surface chemical composition is the contact angle established between a liquid drop and the surface. In FIG. 2, the contact angle theta θ is the angle between a surface 200 and a tangent 202 to a liquid drop 204 at the point of contact with the surface 200. The liquid drop 204 has a receding contact angle as compared to a liquid drop 204' that has a greater contact angle such as an advancing contact angle. The contact angle theta θ can be determined by three parameters: the surface energy of the surface ($\gamma_s$), the surface energy of the liquid ($\gamma_l$), and the interfacial energy between the liquid and the surface ($\gamma_{sl}$), and is described by the Young-Dupré Equation:

$$\cos\theta = \frac{\gamma_s - \gamma_{sl}}{\gamma_l} \quad (1)$$

Both $\gamma_s$ and $\gamma_{sl}$ are sensitive to the surface chemical composition and therefore the contact angle $\theta$ is sensitive to the surface composition. Because of the geometry of a liquid drop, there are other features that can be measured instead of or along with the contact angle. These include the diameter ($D_1$) and/or the height ($h_1$) of the drop, which can be used to calculate the contact angle by a variety of methods.

Figure 3:
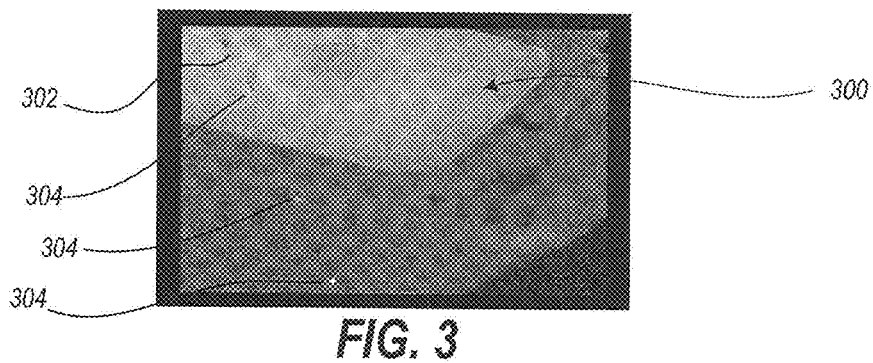
FIG. 3 illustrates a perspective, detailed view of a liquid dispensing device of an example testing apparatus for establishing a receding contact angle showing three droplets exiting from a nozzle valve that is being sequentially opened and closed, according to one or more embodiments.
Figure 4:
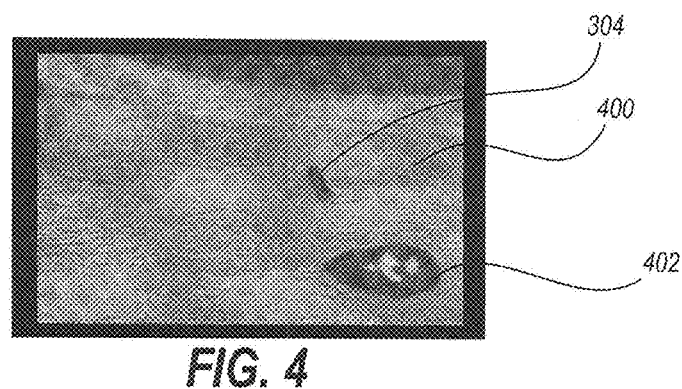
FIG. 4 illustrates a perspective view of a surface of a test article having a growing liquid drop at the point of impact of the droplets of FIG. 3 with a surface, according to one or more embodiments.
Figure 5:
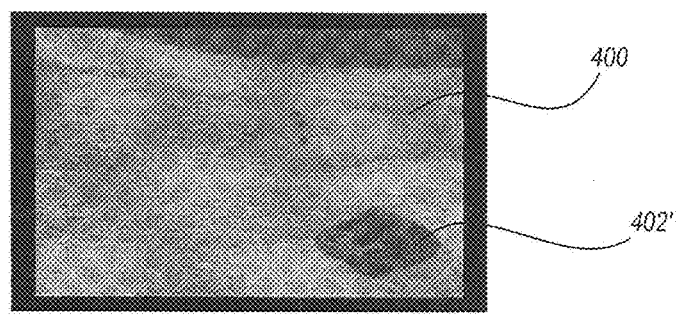
FIG. 5 illustrates a perspective view of the surface of the test article of FIG. 4 immediately after impact of an incoming droplet whose energy distorts and flattens the liquid drop, according to one or more embodiments.
Figure 6:
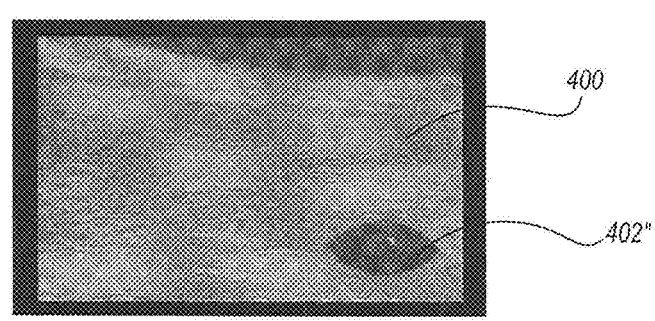
FIG. 6 illustrates a perspective view of the surface of the test article of FIG. 4 a short time later than the view of FIG. 5 after the impact energy has dissipated, according to one or more embodiments.

An example of using this type of apparatus for establishing a receding contact angle is shown in FIGS. 3-6. FIG. 3 illustrates a testing apparatus 300 having a liquid dispenser 302 whose nozzle valve is sequentially opened and closed to dispense three (3) droplets 304. FIG. 4 illustrates a surface 400 upon which a liquid drop 402 is growing at the point of impact of the droplets 304 (FIG. 3) with the surface 400. FIG. 5 illustrates the growing liquid drop 402 immediately after impact of an incoming droplet. The liquid drop 402' is distorted by the energy of impact and flattened. FIG. 6 illustrates the same liquid drop 402" obtained a short time later after the impact energy has dissipated. The diameter of the liquid drop 402' (FIG. 5) immediately after impact is about 7.5% greater than the diameter of the same liquid drop 402"(FIG. 6) after relaxation, illustrating that the final contact angle is established by retraction of the liquid drop 402".

Figure 7:
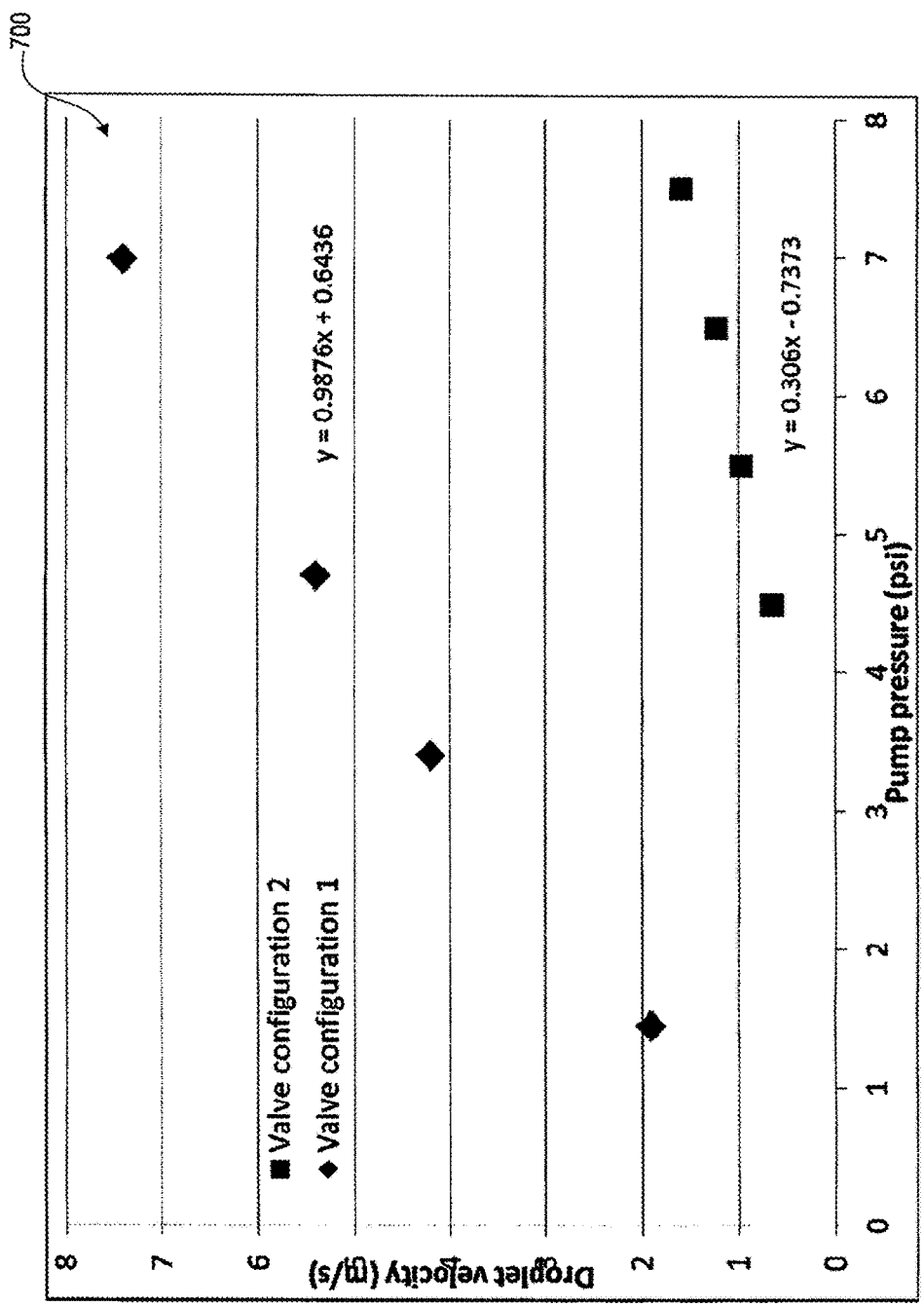
FIG. 7 illustrates a graph of droplet velocity as a function of pressure for two different valve designs, according to one or more embodiments.
Figure 8:
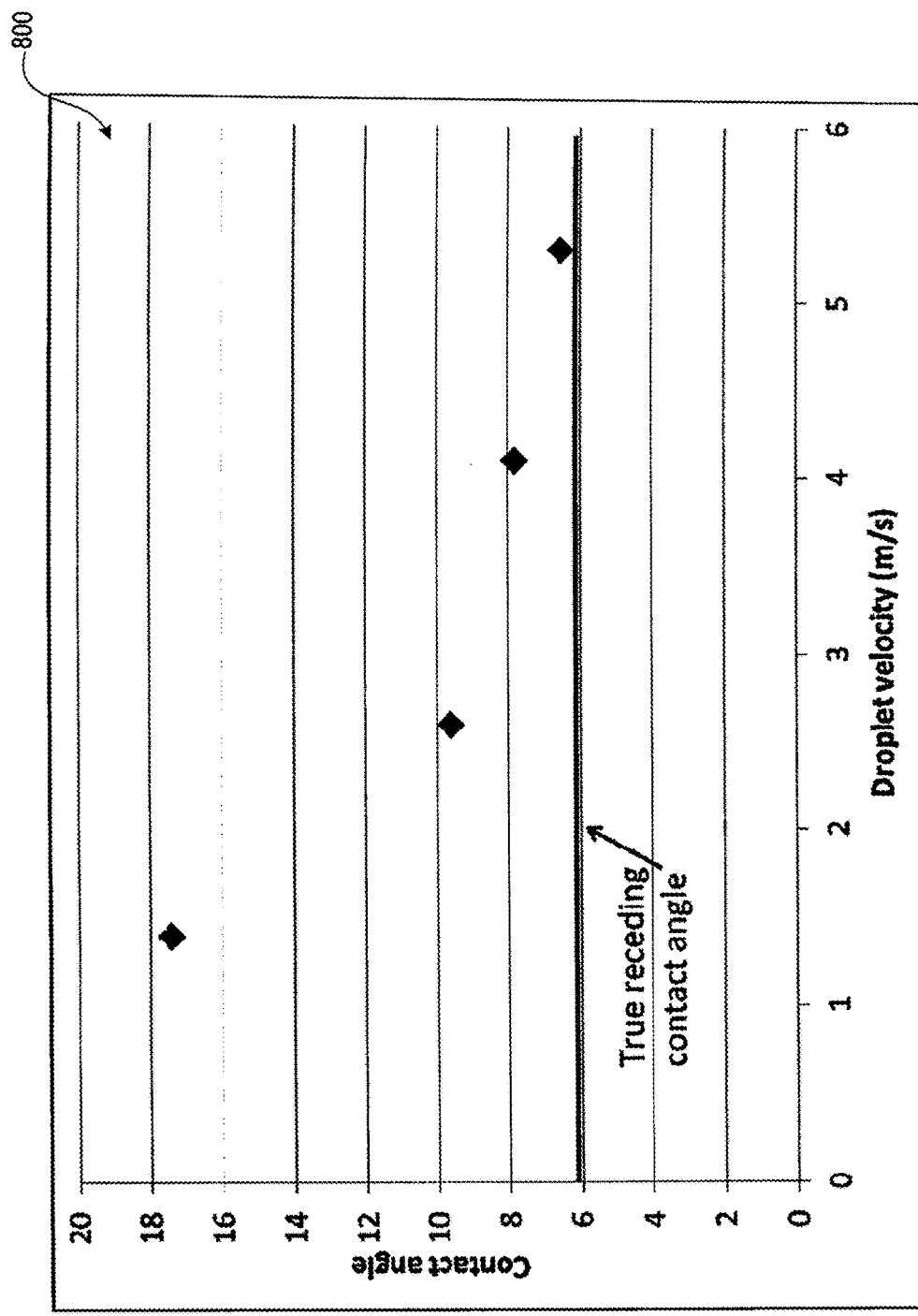
FIG. 8 illustrates a graph of contact angle as a function of droplet velocity, according to one or more embodiments.

If sufficient energy is imparted to the growing drop, the drop retraction in between impacts results in establishment of the receding contact angle. One way to control the amount of energy imparted to the growing drop is by changing the velocity of the incoming droplets. Another is by changing the configuration of the valve, for example by changing the size of the exit orifice. FIG. 7 illustrates a graph 700 of droplet velocity as a function of pressure for two different valve designs. Droplet velocity as a function of liquid pressure is provided for two different valve configurations. FIG. 8 illustrates a graph 800 of contact angle as a function of droplet velocity. As velocities get higher, the reducing contact angles get closer to true receding contact angle. The effect of droplet kinetic energy on the ability to establish a receding contact angle is shown in FIG. 8, which illustrates that contact angles of water obtained from aluminum surfaces that were abraded with 220 grit sandpaper and cleaned with isopropanol. FIG. 8 illustrates that as the velocity of the droplets are increased, the contact angle established by the drop approaches true receding contact angle. Contact angles were obtained from abraded solvent cleaned aluminum as a function of droplet velocity. Horizontal line is the true receding angle obtained using syringe-deposited drops for comparison.

The present innovation thus addresses hysteresis as the difference between advancing and receding contact angle, the latter being related to energy of adhesion is RT/area per mole×ln(adv/rec). A specific amount of adherence can depend on surface and/or contaminants at play. Given deltaW=surface energy of the liquid ($\gamma_l$)×(cos adv−cos rec)

Solution presented is that the important parameter is kinetic energy (KE) of incoming droplet per mass of growing droplet.

For the method to be useful it is not always necessary to establish the true receding contact angle. It is sufficient for many applications to simply establish an angle that shares certain characteristics with the receding angle, i.e. is somewhere between the advancing and receding angle.

In some instances it is actually advantageous to not establish the true receding contact angle but rather an angle intermediate between the advancing and receding angle. For example, some surfaces such as metals and oxidized silicon exhibit receding contact angles close to 0° when freshly prepared and extremely clean as well as after aging for a few hours. Discriminating between these surfaces on the basis of contact angle is more readily accomplished by establishing a contact angle intermediate between the advancing and receding angles.

Figure 9:
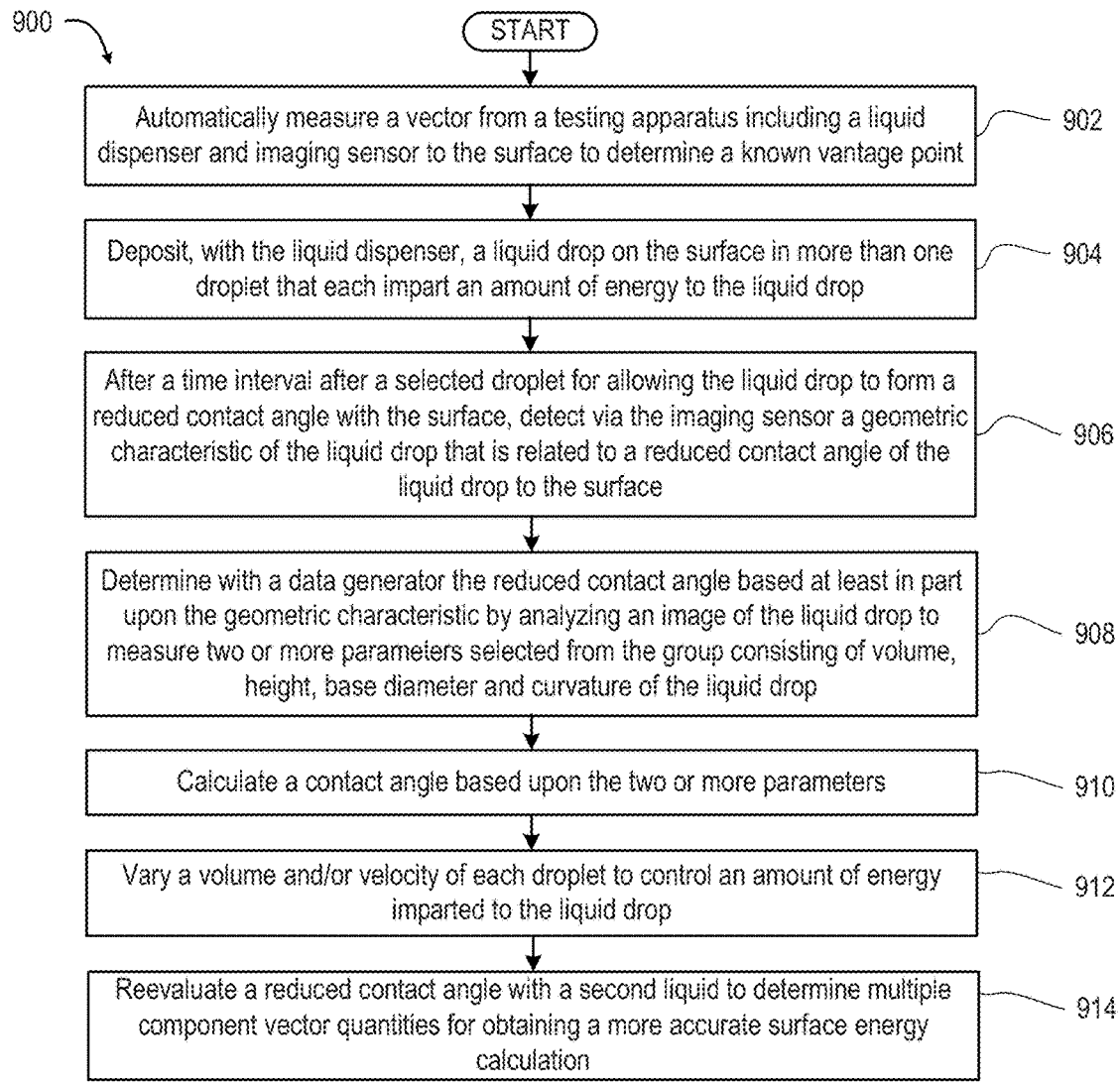
FIG. 9 illustrates a flow diagram of a method of determining a reduced contact angle of liquid on a test article, according to one or more embodiments.

FIG. 9 illustrates a method 900 of determining a reduced contact angle of liquid on a test article. In one embodiment, the method 900 includes automatically measuring a vector from a testing apparatus including a liquid dispenser and imaging sensor to the surface to determine a known vantage point (block 902). The method 900 includes depositing, with the liquid dispenser, a liquid drop on the surface in more than one droplet that each impart an amount of energy to the liquid drop. In particular, the liquid dispenser can impart sufficient energy by the droplets to the liquid droplet to form an advancing contact angle and delays any subsequent droplet over a time interval that is sufficient for the liquid drop to form a receding contact angle (block 904). After a time interval after a selected droplet for allowing the liquid drop to form a reduced contact angle with the surface, the method 900 includes detecting via the imaging sensor a geometric characteristic of the liquid drop that is related to a reduced contact angle of the liquid drop to the surface (block 906). The method 900 includes determining with a data generator the reduced contact angle based at least in part upon the geometric characteristic. In a particular embodiment, the method 900 further includes detecting the geometric characteristic of the liquid drop by analyzing an image of the liquid drop to measure two or more parameters selected from the group consisting of volume, height, base diameter and curvature of the liquid drop (block 908). The method 900 includes calculating a contact angle based upon the two or more parameters (block 910).

As the volume increases or to more closely approach a true receding contact angle, the method 900 can include imparting sufficient energy by the droplets to the liquid droplet to distort the liquid drop laterally and to push the liquid drop perimeter beyond its equilibrium shape such that upon relaxation the liquid drop establishes the reduced contact angle that is less than an advancing contact angle and equal to or greater than a reducing contact angle. In one embodiment, the method 900 includes varying a volume of each droplet to control an amount of energy imparted to the liquid drop. Alternatively or in addition, the method 900 can include varying a velocity of each droplet to control an amount of energy imparted to the liquid drop (block 912). In one embodiment, the method 900 can include reevaluating a reduced contact angle with a second liquid to determine multiple component vector quantities for obtaining a more accurate surface energy calculation (block 914).

Figure 10:
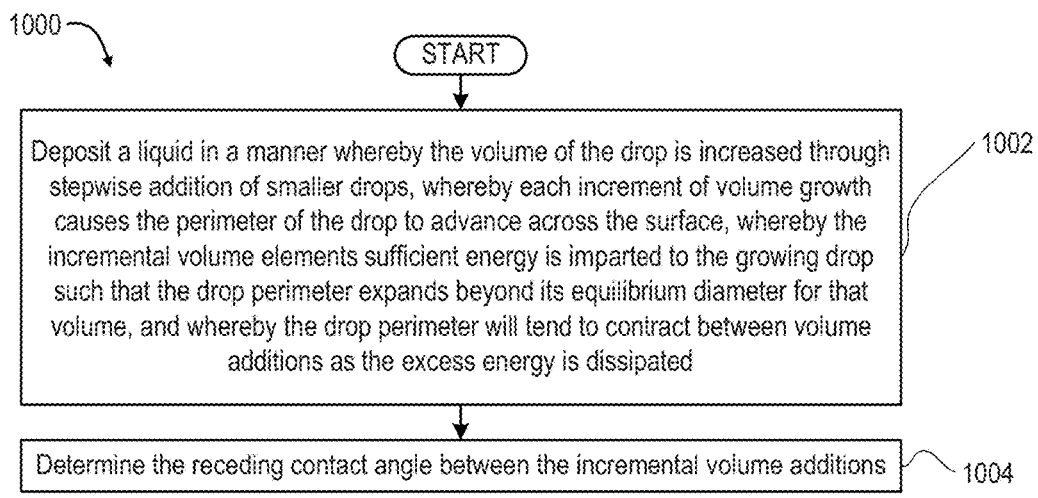
FIG. 10 illustrates a flow diagram of a method of obtaining receding contact angles of liquids on surfaces, according to one or more embodiments.

FIG. 10 illustrates a method 1000 for obtaining receding contact angles of liquids on surfaces. In one embodiment, the method 1000 includes depositing a liquid in a manner whereby the volume of the drop is increased through stepwise addition of smaller drops, whereby each increment of volume growth causes the perimeter of the drop to advance across the surface, whereby the incremental volume elements sufficient energy is imparted to the growing drop such that the drop perimeter expands beyond its equilibrium diameter for that volume, and whereby the drop perimeter will tend to contract between volume additions as the excess energy is dissipated (block 1002). The method 1000 includes determining the receding contact angle between the incremental volume additions (block 1004).

All publications, patents and patent applications cited herein, whether supra or infra, are hereby incorporated by reference in their entirety to the same extent as if each individual publication, patent or patent application was specifically and individually indicated as incorporated by reference.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A testing apparatus for determining a reduced contact angle of liquid on a test article, the testing apparatus comprising:
    an imaging sensor positioned at a known vantage point to a surface of a test article;
    a liquid dispenser to deposit a first liquid as liquid droplets along a trajectory toward the surface to form and to impact energy to a liquid drop, wherein each droplet imparts an amount of energy to the liquid drop to increase the volume of the drop having a drop perimeter, said energy being sufficient for the drop perimeter to expand beyond its equilibrium diameter for that volume; and
    a data generator to:
        after a time interval subsequent to a selected droplet for allowing the drop perimeter to retract as the excess energy is dissipated and the liquid drop to form a reduced contact angle with the surface, detect via the imaging sensor a geometric characteristic of the liquid drop that is related to reduced contact angle of the liquid drop to the surface; and
        determine the reduced contact angle based at least in part upon the geometric characteristic.

2. The testing apparatus of claim 1, wherein the liquid dispenser imparts sufficient energy by the droplets to the liquid drop to form an advancing contact angle and delays a subsequent droplet over a time interval that is sufficient for the liquid drop to form a reduced contact angle.

3. The testing apparatus of claim 1, wherein the liquid dispenser imparts sufficient energy by the droplets to the liquid drop to distort the liquid drop laterally and push the liquid drop perimeter beyond its equilibrium shape such that upon relaxation the liquid drop establishes the reduced contact angle that is less than an advancing contact angle and greater than a reducing contact angle.

4. The testing apparatus of claim 1, wherein:
    the liquid dispenser is to deposit the liquid drop on the surface in more than one droplet by increasing a volume of the liquid drop through incremental additions of smaller droplets with each increment of volume growth causing the perimeter of the liquid drop to advance across the surface, each droplet imparts sufficient energy to the liquid drop to expand a perimeter of the liquid drop beyond its equilibrium diameter for that volume, and each droplet sequenced over a time interval that is sufficient for the perimeter to contract to the reduced perimeter for the volume as excess energy imparted by the droplet is dissipated to form the reduced contact angles are determined during the incremental volume additions.

5. The testing apparatus of claim 1, wherein the liquid dispenser varies a volume of each droplet to control an amount of energy imparted to the liquid drop.

6. The testing apparatus of claim 1, wherein the liquid dispenser varies a velocity of each droplet to control an amount of energy imparted to the liquid drop.

7. The testing apparatus of claim 1, wherein the data generator is further to detect via the imaging sensor the geometric characteristic of the liquid drop by:
    analyzing an image of the liquid drop to measure two or more parameters selected from the group consisting of volume, height, base diameter and curvature of the liquid drop; and
    calculating a contact angle based upon the two or more parameters.

8. The testing apparatus of claim 1, further comprising:
    a source of a second liquid that is selectable to reevaluate multiple component vector quantities for obtaining a more accurate surface energy calculation.

9. The testing apparatus of claim 1, further comprising a hand-held housing that contains the imaging sensor, the liquid dispenser and the data generator.

10. The testing apparatus of claim 1, further comprising a position determining component to determine the known vantage point.

11. A method of determining a reduced contact angle of liquid on a test article, the method comprising:
  positioning an imaging sensor at a known vantage point to a surface of a test article;
  depositing, with a liquid dispenser, a first liquid as liquid droplets along a trajectory toward the surface to form and to impact energy to a liquid drop, wherein each droplet imparts an amount of energy to the liquid drop to increase the volume of the drop having a drop perimeter, said energy being sufficient for the drop perimeter to expand beyond its equilibrium diameter for that volume; and
  after a time interval after a selected droplet for allowing the drop perimeter to retract as the excess energy is dissipated and the liquid drop to form a reduced contact angle with the surface, detecting via the imaging sensor a geometric characteristic of the liquid drop that is related to a reduced contact angle of the liquid drop to the surface; and
  determining with a data generator the reduced contact angle based at least in part upon the geometric characteristic.

12. The method of claim 11, wherein the liquid dispenser imparts sufficient energy by the droplets to the liquid drop to form an advancing contact angle and delays any subsequent droplet over a time interval that is sufficient for the liquid drop to form a reduced contact angle.

13. The testing apparatus of claim 11, wherein the liquid dispenser imparts sufficient energy by the droplets to the liquid drop to distort the liquid drop laterally and to push the liquid drop perimeter beyond its equilibrium shape such that upon relaxation the liquid drop establishes the reduced contact angle that is less than an advancing contact angle and equal to or greater than a reducing contact angle.

14. The method of claim 11, wherein the liquid dispenser varies a volume of each droplet to control an amount of energy imparted to the liquid drop.

15. The method of claim 11, wherein the liquid dispenser varies a velocity of each droplet to control an amount of energy imparted to the liquid drop.

16. The method of claim 11, wherein detecting the geometric characteristic of the liquid drop further comprises:
  analyzing an image of the liquid drop to measure two or more parameters selected from the group consisting of volume, height, base diameter and curvature of the liquid drop; and
  calculating a contact angle based upon the two or more parameters.

17. The method of claim 11, further comprising:
  reevaluating a reduced contact angle with a second liquid to determine multiple component vector quantities for obtaining a more accurate surface energy calculation.

18. The method of claim 11, further comprising automatically measuring a vector from the liquid dispenser to the surface to determine the known vantage point.

19. A method for obtaining equilibrium contact angles of liquids on surfaces, the method comprising:
  depositing a liquid in a manner whereby the volume of the drop is increased through stepwise addition of smaller liquid volume elements,
  whereby each increment of volume growth causes the perimeter of the drop to advance across the surface,
  whereby the incremental liquid volume elements impart sufficient energy to expand a liquid drop perimeter of the growing drop beyond an equilibrium diameter for a volume of the growing drop, and
  whereby the drop perimeter will tend to contract between volume additions as the excess energy is dissipated; and
  determining the equilibrium contact angle between the incremental volume additions.

* * * * *